United States Patent
Kim et al.

(10) Patent No.: US 8,024,113 B2
(45) Date of Patent: Sep. 20, 2011

(54) NAVIGATION SYSTEM

(75) Inventors: Edward Kim, San Francisco, CA (US); Chu Hee Lee, San Jose, CA (US)

(73) Assignee: Volkswagen AG, Wolfsburg (DE)

( * ) Notice: Subject to any disclaimer, the term of this patent is extended or adjusted under 35 U.S.C. 154(b) by 845 days.

(21) Appl. No.: 11/890,025

(22) Filed: Aug. 2, 2007

(65) Prior Publication Data

US 2009/0032326 A1 Feb. 5, 2009

(51) Int. Cl.
*G01C 21/36* (2006.01)
*G06F 19/00* (2006.01)

(52) U.S. Cl. ......... 701/209; 701/211; 348/148; 382/235

(58) Field of Classification Search .................. 701/209, 701/211, 200, 201; 348/148, 141, 142, 231.5; 340/686.1; 382/235
See application file for complete search history.

(56) References Cited

U.S. PATENT DOCUMENTS

| | | | | |
|---|---|---|---|---|
| 4,974,170 | A * | 11/1990 | Bouve et al. .................. | 715/855 |
| 6,222,583 | B1 * | 4/2001 | Matsumura et al. .......... | 348/113 |
| 6,466,865 | B1 | 10/2002 | Petzold | |
| 6,594,581 | B2 | 7/2003 | Matsuda et al. | |
| 6,710,774 | B1 | 3/2004 | Kawasaki et al. | |
| 7,627,420 | B2 * | 12/2009 | Ujino ............................ | 701/200 |
| 7,728,869 | B2 * | 6/2010 | Jung ............................. | 348/113 |
| 2004/0098195 | A1 * | 5/2004 | Listle et al. .................. | 701/211 |
| 2004/0267443 | A1 | 12/2004 | Watanabe | |
| 2006/0164412 | A1 | 7/2006 | Dupont et al. | |
| 2007/0150142 | A1 | 6/2007 | Cieler et al. | |
| 2007/0244634 | A1 * | 10/2007 | Koch et al. .................... | 701/207 |

FOREIGN PATENT DOCUMENTS

| | | |
|---|---|---|
| DE | 698 15 940 | 6/2004 |
| DE | 10 2005 056047 | 6/2006 |
| EP | 0 875 730 | 11/1998 |
| FR | 2 634 707 | 2/1990 |
| WO | WO 97/18440 | 5/1997 |
| WO | WO 00/30057 | 5/2000 |

OTHER PUBLICATIONS

Periodical Autoconnect 2005, Vereinigte Motor-Verlage GmbH & Co. KG (United Motor publishing house, Inc.), Leuschnerstr. 1, 70174 Stuttgart, Federal Republic of Germany, pp. 18 and 21. (translated).
Office Action for U.S. Appl. No. 11/890,024, dated Jul. 7, 2010.
"NavPix", http://www.navman.com/Navman/Templates/productinformation_46258.aspx> May 16, 2007.
"Exchangeable image file format for digital still cameras : Exif Version 2.2", Japan Electronics and Information Technology Industries Association, http://www.kodak.com/global/plugins/acrobat/en/service/digCam/exifStandard2.pdf> Apr. 2002.
International Search Report, issued in corresponding International Application No. PCT/EP2008/006055.

* cited by examiner

*Primary Examiner* — Tan Q. Nguyen
(74) *Attorney, Agent, or Firm* — Kenyon & Kenyon LLP

(57) ABSTRACT

In a navigation system, e.g., for a motor vehicle, for determining the route from a location of the navigation system to a destination point, the navigation system includes an output device for outputting the route and/or a direction indication that corresponds to the route, and an input device for inputting the destination point, graphics or images of selectable destination points being representable for the input of a destination point.

14 Claims, 5 Drawing Sheets

NAVIGATION SYSTEM

FIELD OF THE INVENTION

The present invention relates to a navigation system, e.g., for a motor vehicle, for determining the route from a location of the navigation system to a destination point.

BACKGROUND INFORMATION

U.S. Patent Application Publication No. 2006/0164412 describes a system for 3D-navigation for motor vehicles, which includes an arrangement that combines a first motor vehicle and an environment scanner to generate a three-dimensional image of an environment of the first motor vehicle or at least a part of the environment of the first motor vehicle, as well as at least one second motor vehicle and a communication connection between the first motor vehicle and the second motor vehicle for transmitting to the second motor vehicle the three-dimensional image of the environment around the first motor vehicle or at least a part of the environment around the first motor vehicle.

European Published Patent Application No. 0 875 730 and German Published Patent Application No. 698 15 940 describe a map data display device for use in a vehicle navigation device which has a data-conversion device for recording points of map data according to a map, from a viewpoint through a viewing line that originates from the viewpoint and has an angle of depression with respect to the plane of the map; and for perspectively projecting the points of the map data onto a viewing plane, which is fixed perpendicularly to the viewing line and is a predefined distance from the viewpoint, in order to generate map display data. This produces a bird's eye view of a surrounding area. A navigation system having a bird's eye view of an environment is also described in French Published Patent Application No. 2 634 707 as well as in the document "autoconnect 2005," Vereinigte Motor-Verlage GmbH & Co. KG, Leuschnerstr. 1, 70174 Stuttgart, Germany, pages 18 and 21.

SUMMARY

Example embodiments of the present invention may improve the operability of a navigation system. Example embodiments of the present invention may facilitate the input of destination points into a navigation system.

In a navigation system according to an example embodiment of the present invention, e.g., for a motor vehicle, for determining the route from a location of the navigation system to a destination point, the navigation system includes an output device for outputting the route and/or a direction indication that corresponds to the route, as well as an input device for inputting the destination point, and graphics or images of selectable destination points are able to be represented for the input of a destination point.

An output device may allow an optical output and/or an acoustic output of a route and/or a direction indication that corresponds to the route. An output device may be a display, for example. An input device may include operating elements such as buttons, rotary switches, etc., or similar elements. An input device may also be, or include, a touch panel or a touch screen arranged above a display. If the selection of graphics or images is greater than displayable simultaneously, then scrolling through the graphics or images may be provided.

A graphic or image may be geocoded. Geocoding indicates, e.g., that the coordinates of a point on the earth are assigned on the graphic or image, as illustrated in FIG. 2, for instance. The graphic in FIG. 2 is assigned the coordinates 37°, 53 minutes, 46 seconds northern latitude and 122°, 16 minutes, 9 seconds western latitude.

The graphic data of a graphic or image may be stored in a data file together with a geocoding. The graphic data of a graphic or image together with a geocoding may be stored in a data file in EXIF format. The graphics or images may be displayable sorted by categories. Categories may be, for instance, hotels, restaurants, monuments, etc., or similar things. However, categories may also be transmitters or authors of particular graphics or images.

The navigation system may be assigned a camera for recording an image of an environment of the motor vehicle, and a device for creating a data file including the image and a geocoding that corresponds to the location of the navigation system or motor vehicle.

In a method for operating a navigation system which includes one or a plurality of the aforementioned features, e.g., a navigation system for a motor vehicle, for determining the route from a location of the navigation system to a destination point, graphics or images of selectable destination points are displayed.

The graphics or images may be shown sorted by categories.

A motor vehicle may be, e.g., a land vehicle that may be used individually in road traffic. Motor vehicles, however, are specifically not limited to land vehicles having an internal combustion engine.

According to an example embodiment of the present invention, a navigation system for determining a route from a location of the navigation system to a destination point includes: an output device configured to output at least one of (a) the route and (b) a direction indication that corresponds to the route; and an input device configured to input the destination point, images of selectable destinations representable for input of a destination.

An image may include a geocode.

The navigation system may be configured to store image data of an image and a geocode in a data file.

The navigation system may be configured to store image data of an image together with a geocode in a data file in EXIF format.

The images may be displayable sorted by categories.

According to an example embodiment of the present invention, a motor vehicle includes a navigation system configured to determine a route from a location of the navigation-system to a destination point. The navigation system may include any one or more of the features described herein.

The motor vehicle may include: a camera configured to record an image of an environment of the motor vehicle; and a device configured to create a data file including the image and a geocode that corresponds to the location of the motor vehicle.

According to an example embodiment of the present invention, a method for operating a navigation system includes: displaying at least one of (a) graphics and (b) images of selectable destination points; inputting a destination point by selecting one of the displayed images; determining a route from a location of the navigation system to the input destination point; and outputting at least one of (a) the route and (b) a direction indication that corresponds to the route.

Further features and aspects of example embodiments of the present invention are described in more detail below with reference to the appended Figures.

DETAILED DESCRIPTION

Figure 1:
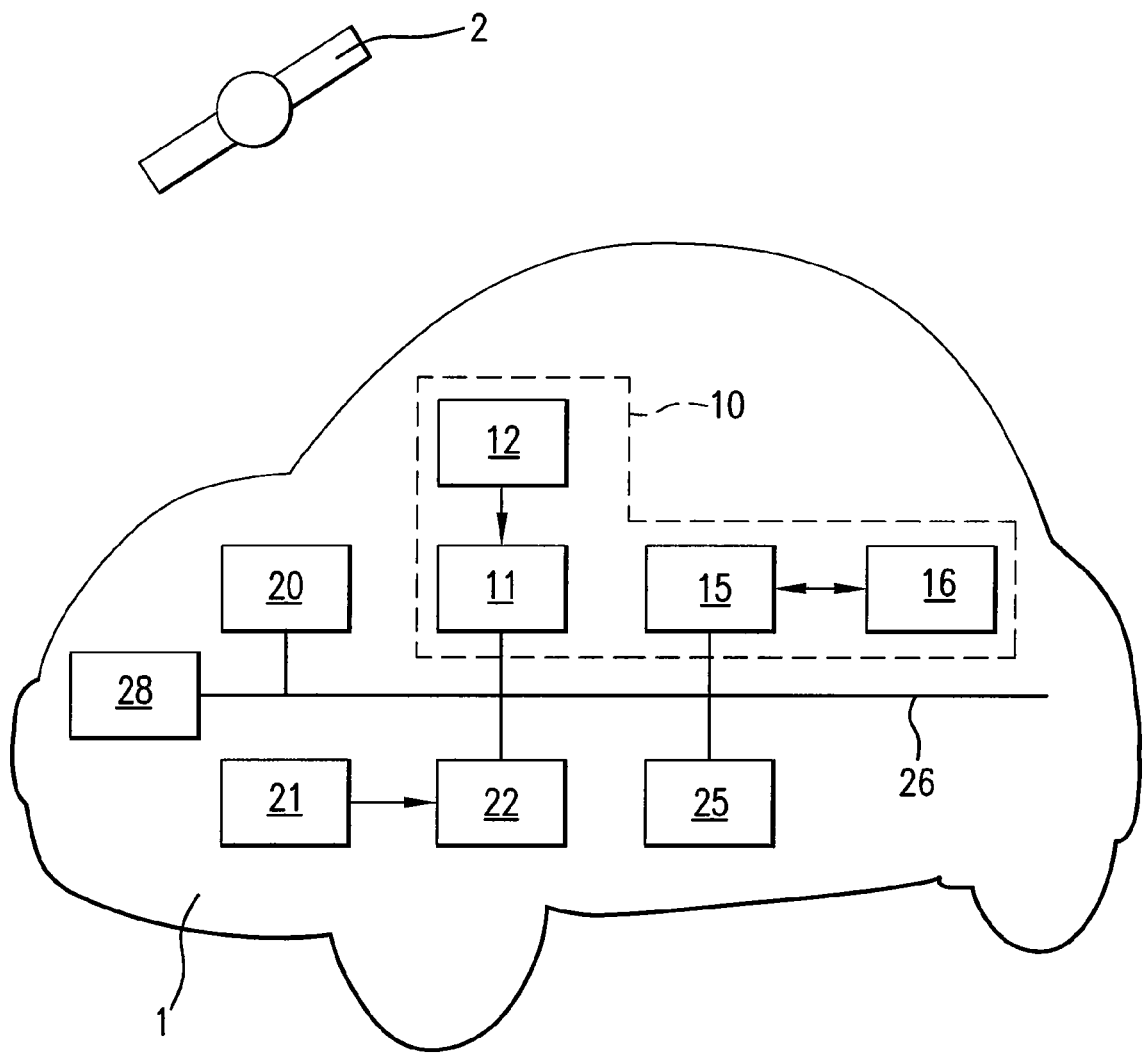
FIG. 1 schematically illustrates an exemplary embodiment of a motor vehicle.

FIG. 1 schematically illustrates an exemplary embodiment of a motor vehicle 1. Motor vehicle 1 includes a display and operating device 16 as well as a display and operating control 15 to control display and operating device 16. Motor vehicle 1 also includes a navigation module 11, which is connected to an antenna 12 for receiving items of information transmitted from satellite 2. Navigation module 11 is connected to display and operating control 15 via a bus system 26. Antenna 12 and navigation module 11 in conjunction with display and operating control 15 as well as display and operating device 16 form a navigation system 10.

Figure 2:
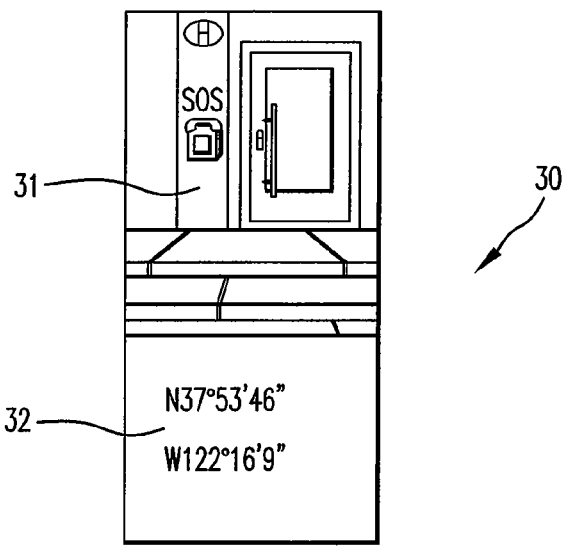
FIG. 2 schematically illustrates an exemplary embodiment of a geocoded image data file.
Figure 3:
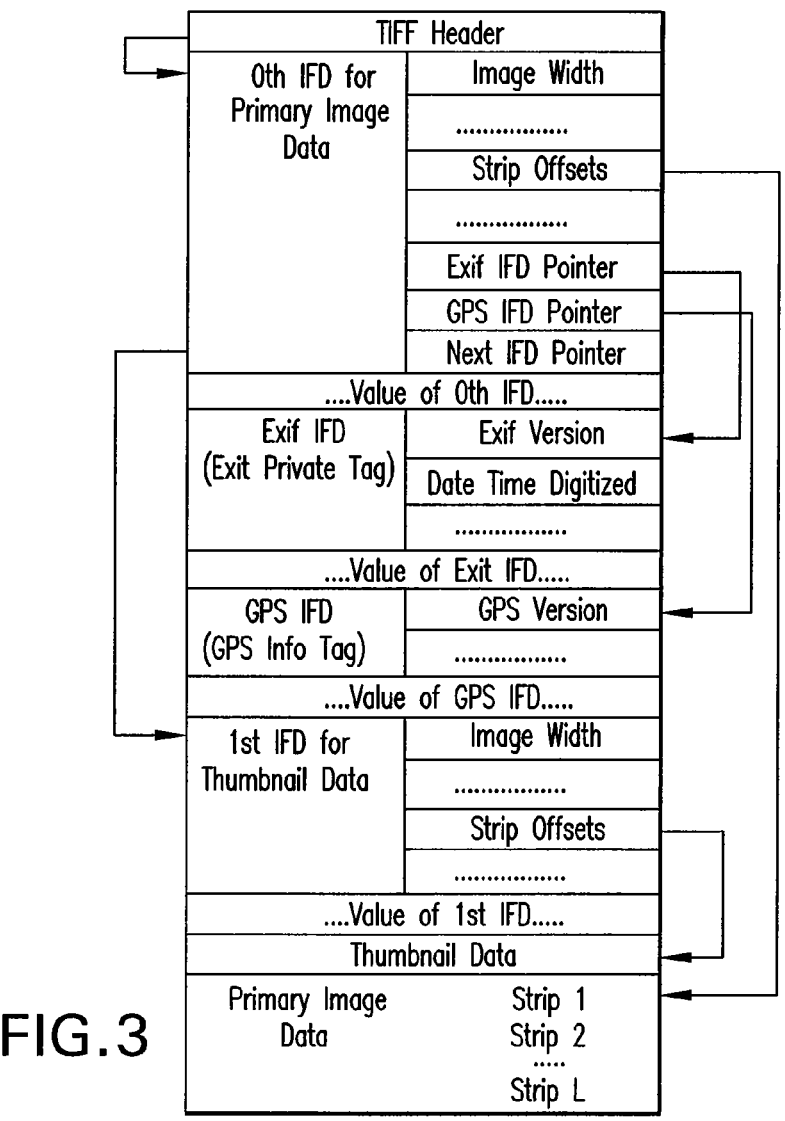
FIG. 3 illustrates an exemplary embodiment of a geocoded image data file.

In addition, motor vehicle 1 includes an image-transmission interface 20 by which geocoded image data files, as illustrated in FIG. 2 and FIG. 3 by way of example, are able to be read in. Image-transmission interface 20 may be, or include, an SD reader, for instance. As an alternative or in addition, image-transmission interface 20 may be arranged as a USB interface, a Wi-Fi interface, a Bluetooth interface, a cellular phone interface, etc. Image-transmission interface 20 may be connected to navigation module 11 via bus system 26. It is also possible for image-transmission interface 20 to be connected to navigation module 11 for a data link in an alternative manner and/or to be part of navigation system 10. Additional modules 25 such as a climate-control system, a telephone, an infotainment system, etc., may be connected to bus system 26.

FIG. 2 schematically illustrates a geocoded image data file 30. Image data file 30 includes a graphic or image 31 as well as a geocoding 32. In the illustrated exemplary embodiment, the geocoding includes the entry 37°, 53 minutes, 46 second northern latitude and 122°, 16 minutes, 9 seconds western longitude. Such a data file may be stored in EXIF format (EXchangeable Image File), as illustrated in FIG. 3. In this format, the graphic or image components, for example, are stored in JPEG format.

Figure 4:
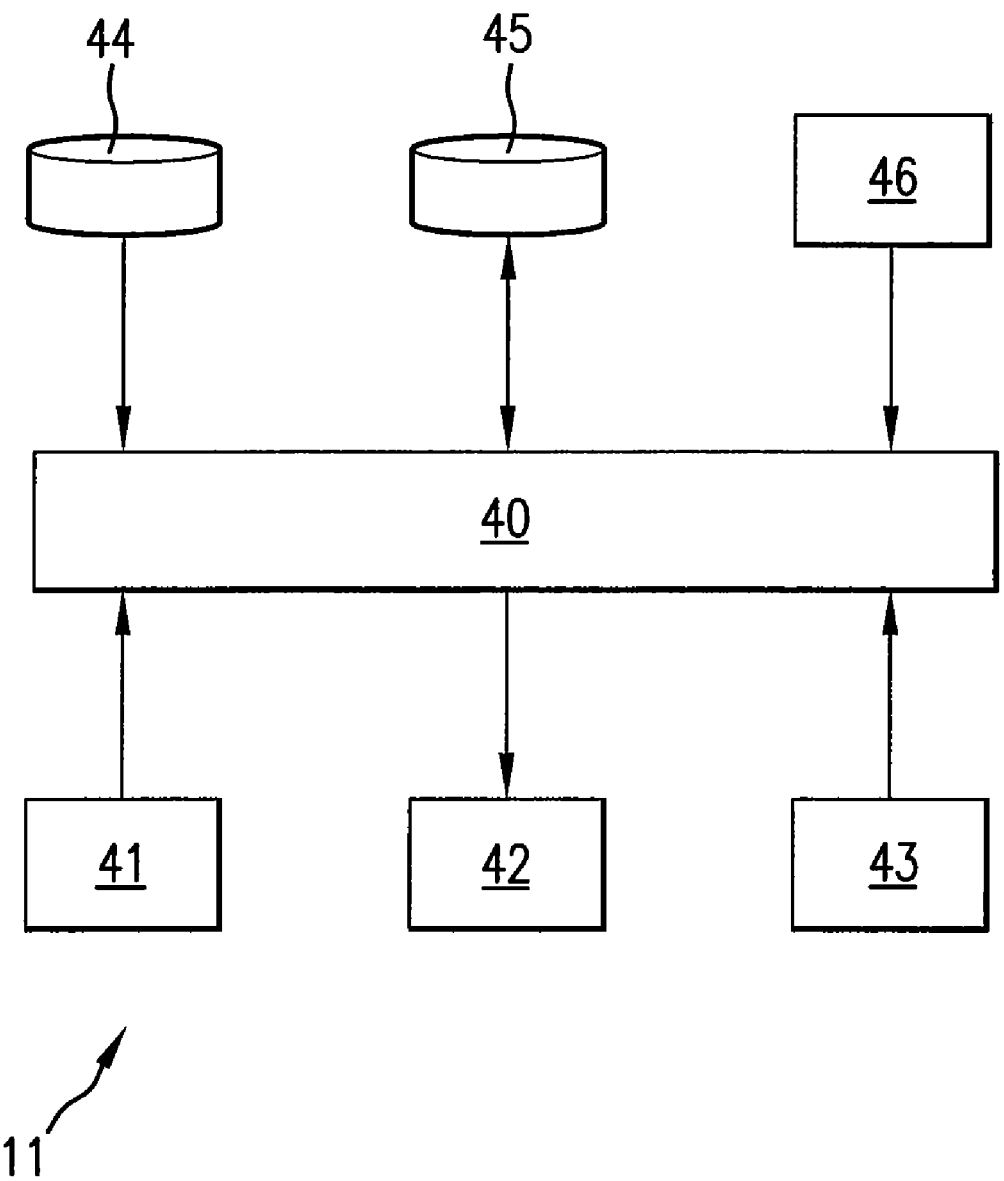
FIG. 4 schematically illustrates an exemplary embodiment of a navigation module.
Figure 5:
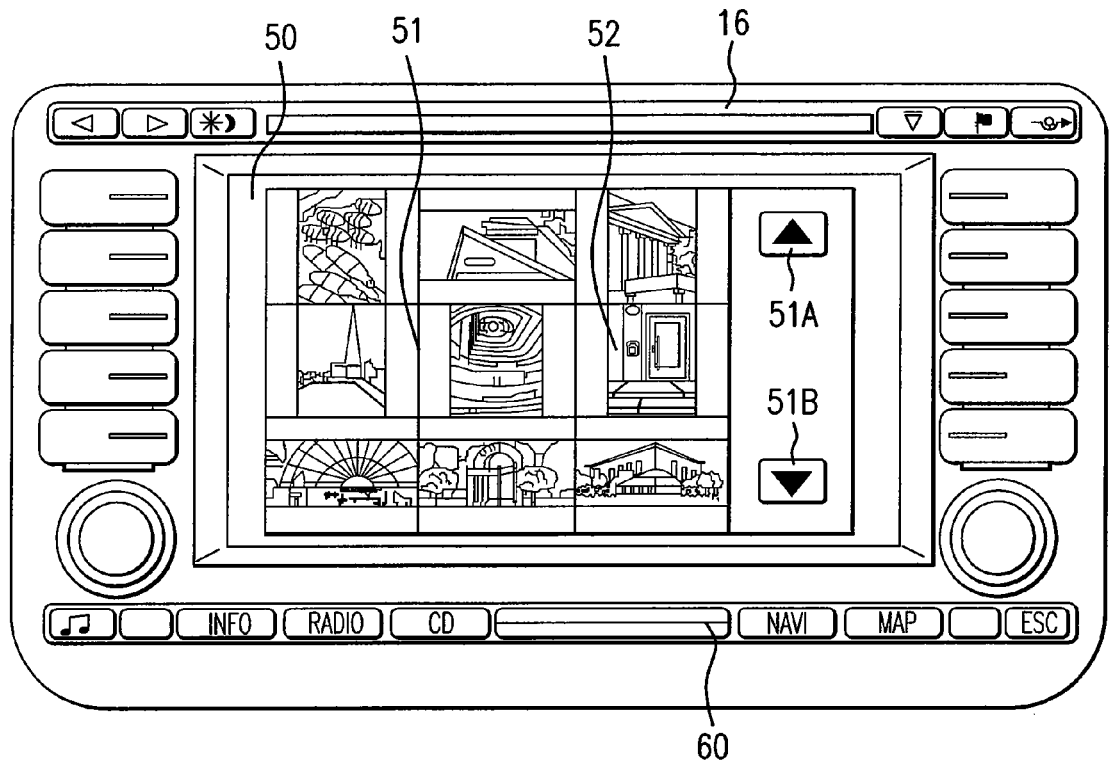
FIG. 5 schematically illustrates a display and operating device.

FIG. 4 illustrates an exemplary embodiment of navigation module 11. Navigation module 11 includes a navigation algorithm 40 for determining the location of motor vehicle 1 as a function of the signals received from antenna 12 or as a function of items of information that are read in via an interface 46, and for determining a route from this location to an input destination. Navigation algorithm 40 accesses a route atlas 44 for this purpose. Inputs into navigation algorithm 40 are made via an interface 41, and outputs via an interface 42. Furthermore, an interface 43 (EXIF tag parser API) is provided to read in geocoded image data files. The geocoded image data files read in this manner may be stored in a memory 45, for example.

The method of functioning of navigation module 11 or navigation system 10 is described with reference to FIGS. 5 to 8. FIGS. 5 to 8 illustrate display and operating device 16. In addition to operating elements, such as push-button switches and rotary buttons, display and operating device 16 includes a display 50 above which a touch screen is disposed. To input a destination point, an operator or user of motor vehicle 1 or navigation system 10 is offered a selection 51 of graphics or images of inputtable destination points. To provide the option of calling up additional selectable images or destination points, scroll push buttons 51A and 51B are displayed on the display. Touching the touch screen in the region of displayed scroll push buttons 51A and 51B allows scrolling through the assortment of selectable graphics or images or the destination points they represent.

Figure 6:
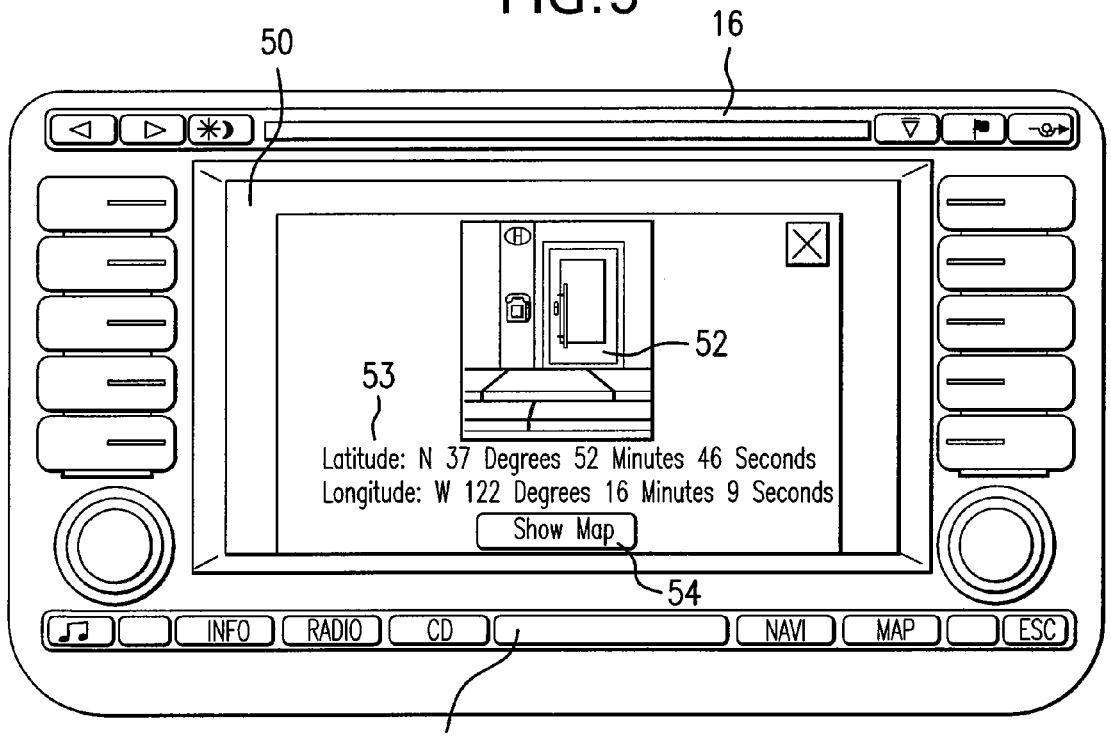
FIG. 6 illustrates the display and operating device illustrated in FIG. 5 in a different display state.
Figure 7:
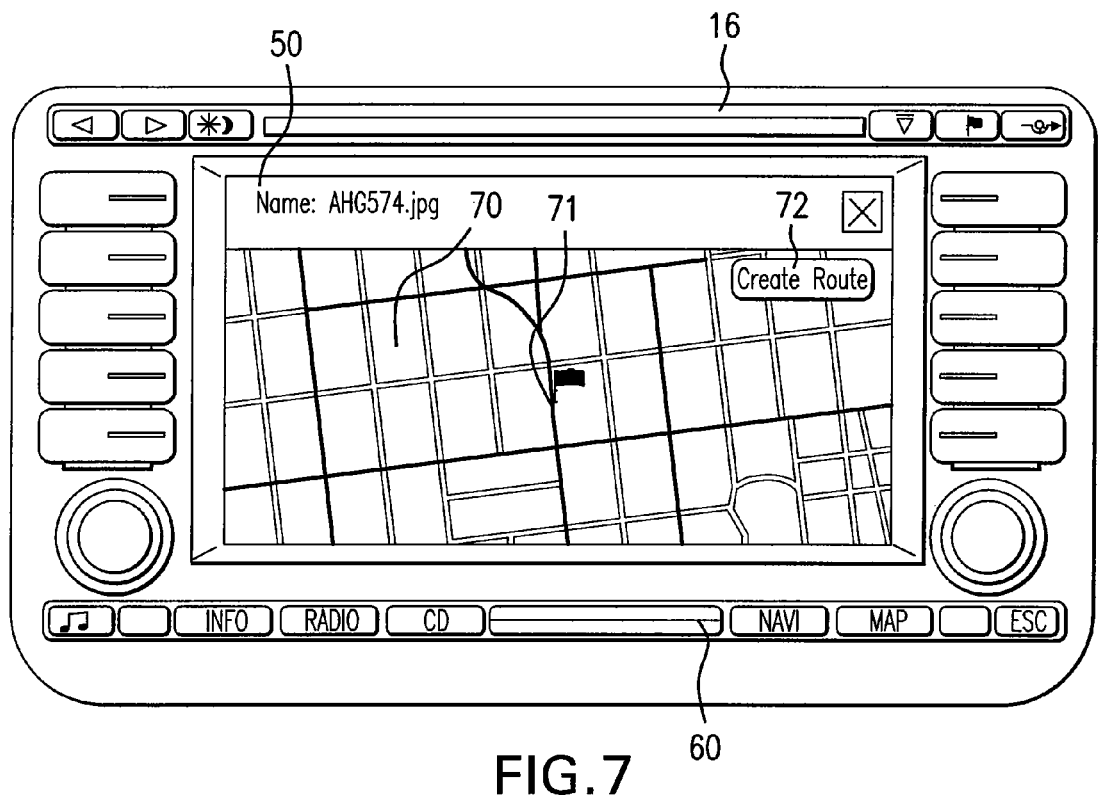
FIG. 7 illustrates the display and operating device illustrated in FIG. 5 in a different display state.

A destination point is selected by touching the touch screen in the region of a graphic or an image representing that particular destination point. For example, if the touch screen is touched in the region of graphic or image 52, then the representation on display 50 changes, as illustrated in FIG. 6. Graphic or image 52 is shown in an enlarged view in that case. A display 53 of the geocoding of image or image 52 takes place in addition. By touching the touch screen in the area of operating element 54, the position of destination point 71, symbolized by graphic or image 52, is indicated on a map 70 as illustrated in FIG. 7. In addition, an operating element 72 is displayed.

Figure 8:
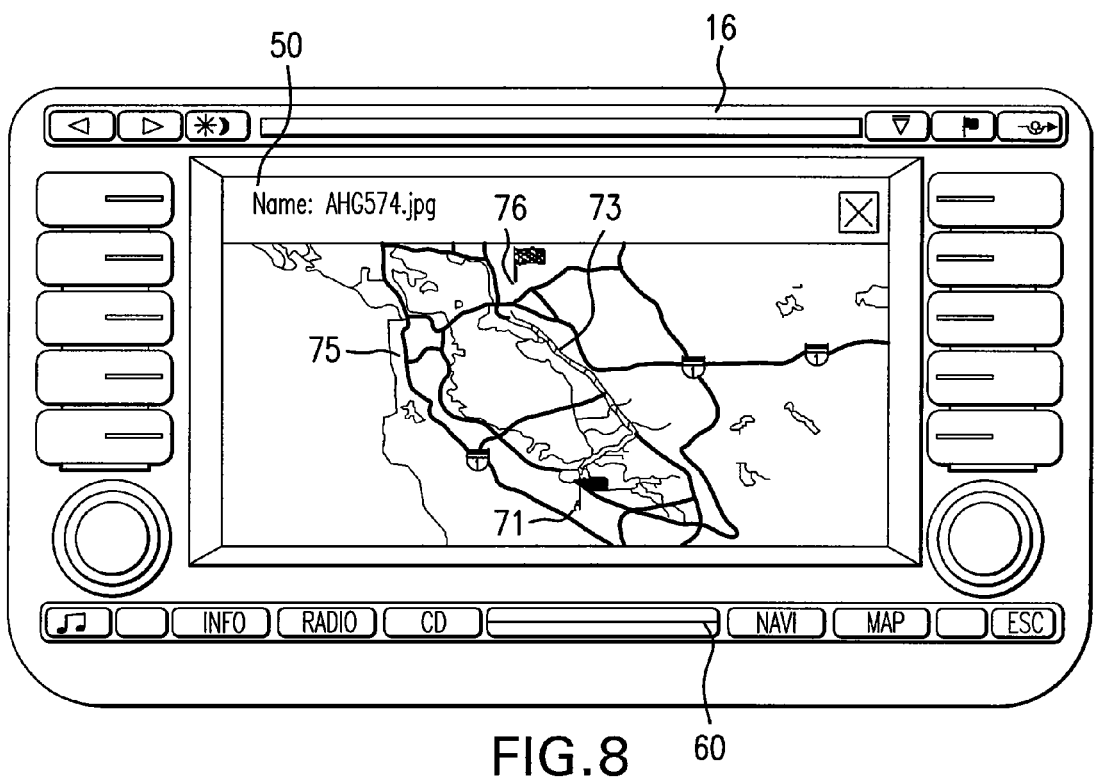
FIG. 8 illustrates the display and operating device illustrated in FIG. 5 in a different display state.

By touching the touch screen in the region of operating element 72, a calculation of the route from the location of navigation system 10 or motor vehicle 1 to selected destination point 71 is implemented. The route—as illustrated in FIG. 8—is subsequently indicated in a map display 75. Reference numeral 76 denotes the location of navigation system 10 or motor vehicle 1, and reference numeral 73 denotes the route from location 76 of navigation system 10 or motor vehicle 1 to destination point 71.

In the exemplary embodiment illustrated in FIGS. 5 to 8, an SD card reader is provided in display and operating device 16. This SD card reader 60 is an exemplary embodiment for image-transmission interface 20.

Motor vehicle 1, as illustrated in FIG. 1, may include a camera 21 to record an image of the environment of motor vehicle 1, and a geocoder 22 by which a graphic or image recorded by camera 21 is coded by a geocoding. To this end, geocoder 22 receives the coordinates of location 76 of motor vehicle 1 or navigation system 10 from navigation module 11. An image data file generated by geocoder 22 is able to be read into navigation module 11. As an alternative or in addition, the geocoded image data file may be transmitted to a stationary device and/or another motor vehicle via a communication interface 28.

LIST OF REFERENCE CHARACTERS 1 motor vehicle
2 satellite
10 navigation system
11 navigation module
12 antenna
15 display and operating control
16 display and operating device
20 image-transmission interface
21 camera
22 geocoder
25 additional modules
26 bus system
28 communication interface
30 image data file
31, 52 graphic or image 32 geocoding
40 navigation algorithm
41 interface
42, 43 46 interface
44 route atlas
45 memory
50 display
51 selection of graphics or images
51A, 51B scroll push button
53 display of a geocoding
54 operating element
60 SC card reader
70 map
71 destination point
72 operating element
73 route
75 map display
76 location

What is claimed is:

1. A navigation system for determining a route from a location of the navigation system to a destination point, comprising:
   an input device configured to input the destination point, images of selectable destinations representable for input of a destination;
   a calculation device adapted to calculate the route from the location of the navigation system to the destination point input via the input device by the selection of the destination point represented as an image; and
   an output device configured to output at least one of (a) the route and (b) a direction indication that corresponds to the route,
   wherein the images of selectable destinations are selectable prior to a display of the images on a map.

2. The navigation system according to claim 1, wherein an image includes a geocode.

3. The navigation system according to claim 1, wherein the navigation system is configured to store image data of an image and a geocode in a data file.

4. The navigation system according to claim 1, wherein the navigation system is configured to store image data of an image together with a geocode in a data file in EXIF format.

5. The navigation system according to claim 1, wherein the images are displayable sorted by categories.

6. A motor vehicle, comprising:
   a navigation system configured to determine a route from a location of the navigation system to a destination point, the navigation system including:
      an input device configured to input the destination point, images of selectable destinations representable for input of a destination;
      a calculation device adapted to calculate the route from the location of the navigation system to the destination point input via the input device by the selection of the destination point represented as an image; and
      an output device configured to output at least one of (a) the route and (b) a direction indication that corresponds to the route,
      wherein the images of selectable destinations are selectable prior to a display of the images on a map.

7. The motor vehicle according to claim 6, wherein the image includes a geocode.

8. The motor vehicle according to claim 6, wherein the navigation system is configured to store image data of an image together with a geocode in a data file.

9. The motor vehicle according to claim 6, wherein the navigation system is configured to store image data of an image together with a geocode in a data file in EXIF format.

10. The motor vehicle according to claim 6, wherein the images are displayable sorted by categories.

11. The motor vehicle according to claim 6, further comprising:
   a camera configured to record an image of an environment of the motor vehicle; and
   a device configured to create a data file including the image and a geocode that corresponds to the location of the motor vehicle.

12. A method for operating a navigation system, comprising:
   displaying at least one of (a) graphics and (b) images of selectable destination points;
   inputting a destination point by selecting one of the displayed images;
   determining a route from a location of the navigation system to the input destination point; and
   outputting at least one of (a) the route and (b) a direction indication that corresponds to the route,
   wherein the displayed images are selectable prior to a display of the images on a map.

13. The method according to claim 12, wherein the image includes a geocode.

14. The method according to claim 12, wherein the images are displayed sorted by categories.

* * * * *